United States Patent [19]
Torgerson

[11] 3,800,068
[45] Mar. 26, 1974

[54] STRAIN RELIEF
[75] Inventor: Duane E. Torgerson, Aurora, Ill.
[73] Assignee: Belden Corporation, Chicago, Ill.
[22] Filed: Jan. 10, 1972
[21] Appl. No.: 216,568

[52] U.S. Cl. .......................... 174/135, 339/102 R
[51] Int. Cl. ............................................ H01r 13/56
[58] Field of Search .......... 248/56; 174/135, 152 G, 174/153 G; 16/2; 339/26, 59, 61, 62, 63, 101, 102, 103, 108 TP, 116, 213; 285/115, 116; 24/122.3

[56] References Cited
UNITED STATES PATENTS
2,664,458  12/1953  Rapata ............................ 16/2 X
1,675,763  7/1928   McCarthy ...................... 339/103 R
2,125,555  8/1938   Frantz ............................ 339/63 R
2,035,345  3/1936   Schaefer ........................ 339/101
3,065,004  11/1962  Laich ............................. 16/2 X
3,395,244  7/1968   Koehler ........................ 339/101 X Primary Examiner—Richard E. Moore
Attorney, Agent, or Firm—Fich, Even, Tabin & Luedeka

[57] ABSTRACT

A strain relief for electrical cords wherein the flexible characteristics of the end of the tail portion are improved.

4 Claims, 3 Drawing Figures

PATENTED MAR 26 1974 3,800,068

STRAIN RELIEF

The present invention relates to strain reliefs for electrical cords and more particularly to an improvement in the strain relief which affords to the associated cord an enhanced flex life.

Strain reliefs are employed to structurally attach electrical cords to electrical apparatus and in applications wherein there is considerable flexing of the cord relative to the electrical apparatus, the strain relief is additionally provided with a tail portion to protect the cord from stresses caused by flexure of the cord. In this latter connection, the strain relief tail portion causes the portion of the cord within the tail portion to bend in an arc, thus eliminating sharp bends in the cord adjacent the electrical apparatus which, after repeated flexing, would cause premature failure of the cord.

A common disadvantage of such a strain relief is that at the point along the cord adjacent the outer end of the strain relief tail portion there is an abrupt change in the ability of the cord to curve while being flexed. This change occurs because the cord ceases to be supported by the strain relief. When the cord is repeatedly flexed, failure of the cord results because the cord tends to bend sharply at this point.

It is the primary object of the present invention to provide an improved strain relief for an electrical cord.

It is another object to provide a strain relief for an electrical cord which provides enhanced flex life to the cord.

These and other objects of the invention are more particularly set forth in the following detailed description and in the accompanying drawings, of which:

Figure 1:
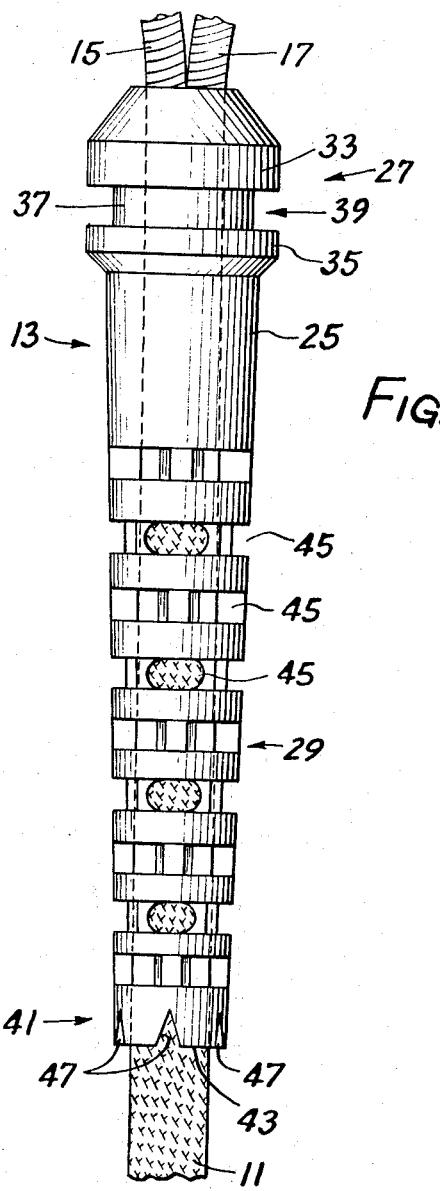
FIG. 1 is a plan view of a strain relief for an electrical cord embodying features of the present invention with the ends of the cord extending on either side of the strain relief being broken away and the portion of the cord within the strain relief being shown in phantom.

Referring to the drawings, there is illustrated an insulated flexible electrical conductor cord 11 about which is molded a strain relief 13. The illustrated strain relief and cord are particularly designed for use with a heating appliance such as an iron.

The conductor cord 11, as illustrated, is generally circular in cross section and comprises a pair of electrically conductive wires 15 and 17, each of which is enclosed in an insulating sheath 19. The insulated wires are encased in an outer surface insulating jacket 21 of a flexible material, such as a braided fabric. The space between the insulated wires and the jacket is filled with an insulating and cushioning medium 23, such as asbestos roving.

The strain relief 13 comprises a relatively thin tubular sleeve 25 which has a head portion 27 and a tail portion 29. The strain relief is formed about the electrical cord 11 so that the sleeve inner surface 31 is attached to the cord's outer jacket 21. The sleeve is injection molded of a resilient flexible material, such as vinyl and is generally circular in cross section.

The tubular head portion 27 is disposed around the cord 11 and is integrally formed with the tubular tail portion 29 of the strain relief 13. The illustrated head portion 27 comprises an enlarged circular abutment portion 33 and another enlarged circular abutment portion 35, spaced a distance apart toward the tail portion. The two abutment portions are integrally connected by a smaller circular portion 37 thereby defining a groove 39 between the two abutment portions 33 and 35. When the head portion 27 is inserted in an electrical apparatus, such as a heating appliance, the frame of the appliance will be disposed in the groove 39 between the two abutment portions 33 and 35.

The tubular tail portion 29 uniformly tapers inwardly from the end adjacent the head portion 27 to the tail portion outer end 41. The end of the tail portion which is opposite the head portion is substantially smaller in diameter and wall thickness than is that part of the tail portion which is adjacent the head portion. In FIG. 1, the portion of the cord 11 within the strain relief is shown in dotted outline and in this manner the relative thickness of the sleeve's walls may be readily observed. This construction produces a relatively greater flexibility nearer the outer end 41 of the tail portion 29 than near the end of the tail portion adjacent the head portion 27.

The tail portion is provided with a plurality of apertures 45 which extend radially through the wall of the tail portion, and are in communication with the cord 11. In the illustrated embodiment, each aperture 45 is generally wedge-shaped in radial cross section with a plurality of axially spaced sets of four circumferencially disposed apertures being provided. These sets of apertures are gradually spaced closer together toward the outer end 41 of the tail portion, so that the tail portion bends in substantially a smooth curve when it is flexed. These apertures have the additional advantage of imparting improved flexibility to the tail portion.

In the illustrated embodiment of the present invention, the strain relief 13 is provided with five notches 47 at the outer end 41 of the tail portion. These notches are uniformly circumferentially spaced apart around the edge 43 of the tail portion outer end 41. Each of the notches is triangular in plan, having a base which is positioned along the edge 43 of the tail portion, and an apex spaced a predetermined lineal depth from the base toward the head portion 27 of the strain relief. The notches are of a vertical depth so as to extend completely through the sleeve wall and be in communication with the cord 11. By this construction each of the portions of the outer end 41 between the notches 47 is capable of individual limited movement relative to adjacent outer end portions.

Figure 3:
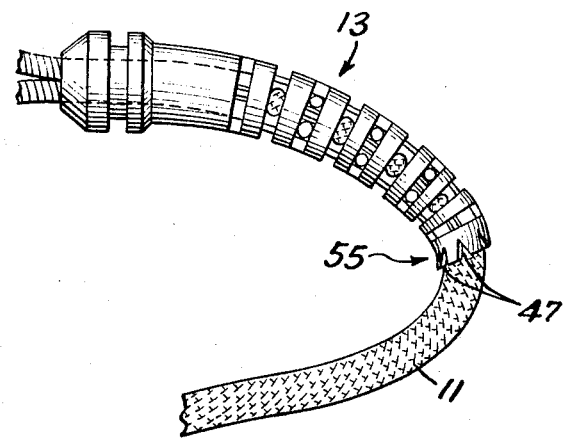
FIG. 3 is a reduced plan view of the cord and strain relief of FIG. 1 in a flexed position.
Figure 2:
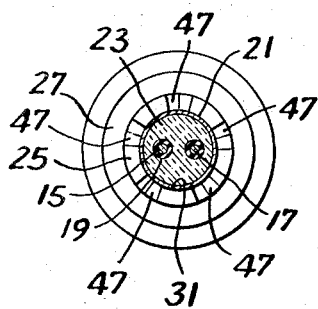
FIG. 2 is an end view of the cord and strain relief shown in FIG. 1.

These notches 47 remove increasingly larger amounts of material from the strain relief tail portion as one approaches the edge 43 of the tail portion. In this manner, the end of the tail portion is gradually rendered more flexible so as to cause the flexing characteristics of the tail portion to gradually approach that of the cord 11 alone. As shown in FIG. 3, this permits a gradual bend 55 at the end of the tail portion, rather than the abrupt bend of the prior art strain relief, thereby enhancing the flex life of the cord at this point.

While the preferred embodiment illustrates triangular notches, certain benefits of this invention may be obtained by notches of other configurations, such as providing curved side walls on the notch. Also, the benefits of the invention may be obtained to a limited extent by notches having straight, parallel sides. Similar reduced efficiency may be achieved by notches which do not extend completely through the sleeve wall to the surface of the cord but are merely adjacent the inner surface of the tubular tail portion such that the relative thickness of the remaining portion of the sleeve wall does not severely detract from the ability of the notches' sides to converge or diverge. In this connection it should be noted that when these notches are formed at the time the strain relief is molded onto a cord it is very difficult to prevent a very thin film or layer of material being formed which is in contact with the cord in the notched area. This film of material has virtually no effect on the efficiency of the notches and the notches may be considered as extending completely through the tubular wall of the tail portion.

In one example, a strain relief is disposed around a cord 5/16 of an inch in diameter and is approximately 3¼ inches long, having a head portion which is about 5/8 of an inch long, with the remainder of the length of the strain relief forming the tail portion. The tail portion in cross section has a diameter of approximately ½ of an inch adjacent the head portion and approximately ⅜ of an inch at its outer edge. In a strain relief of these dimensions, the triangular notches of the illustrated embodiment have a base approximately 3/32 of an inch wide, and an altitude or lineal depth of approximately 3/16 of an inch.

It has been demonstrated by laboratory testing that a cord protected by the improved strain relief was, prior to failure, flexed 24 percent more times than a cord protected by a similar strain relief without the notches.

While a specific embodiment of the strain relief has been shown and described, it should be apparent that various modifications may be made therein without departing from the scope of the invention.

Various of the features of the invention are set forth in the following claims.

What is claimed is:

1. In a combination comprising an electrical cord and a strain relief, said strain relief comprising a tubular head portion, and an elongated tubular flexible tail portion extending from said head portion and terminating in an outer end and including a tubular wall, said head portion and said tail portion being integral and being molded about an outer surface of said electrical cord and thereby firmly attached thereto, said tail portion being provided with a plurality of circumferentially spaced notches extending from said outer end of said tail portion in the direction of said head portion, each of said notches extending from the outer surface of the tubular wall to a depth adjacent the inner surface of the tubular wall of said tail portion to define flexible sections between adjacent notches, said sections being bendable by said cord and increasing the flexibility of said tail portion adjacent said outer end.

2. A strain relief in accordance with claim 1, wherein each of said notches extends completely through said wall of said tail portion.

3. A strain relief in accordance with claim 1, wherein each of said notches is of substantially triangular configuration with the base thereof being disposed along the edge of said outer end of said tail portion and with the apex of said notch being spaced from said base in the direction of said head portion.

4. A strain relief in accordance with claim 1, wherein said circumferential spacing is uniform.

* * * * *